Aug. 8, 1933.                L. H. KAMPER                1,921,232
                AUTOMATIC CONTROL SYSTEM FOR WASTE WATER
                Filed May 31, 1930              2 Sheets-Sheet 1
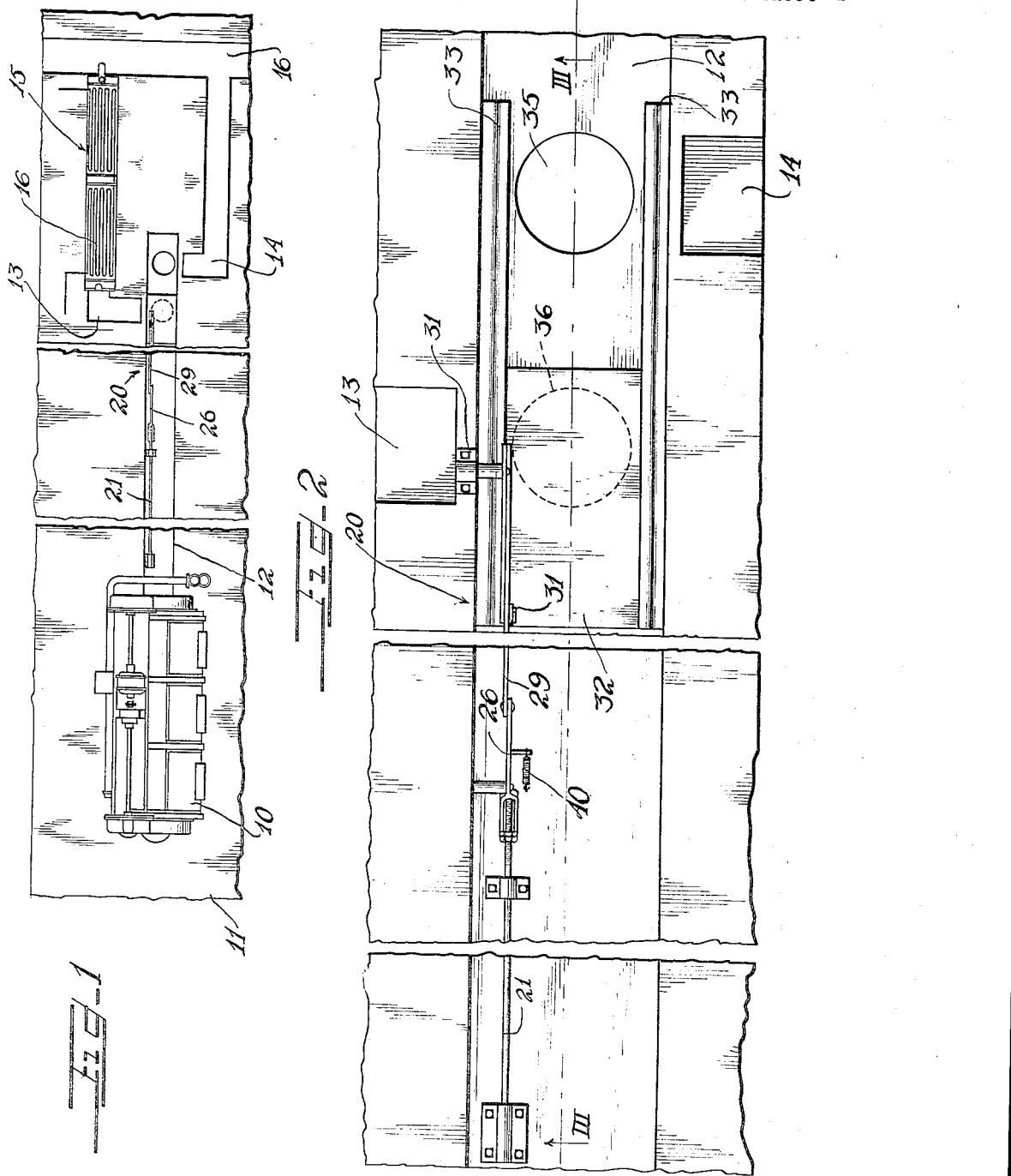
Inventor
Leslie H. Kamper

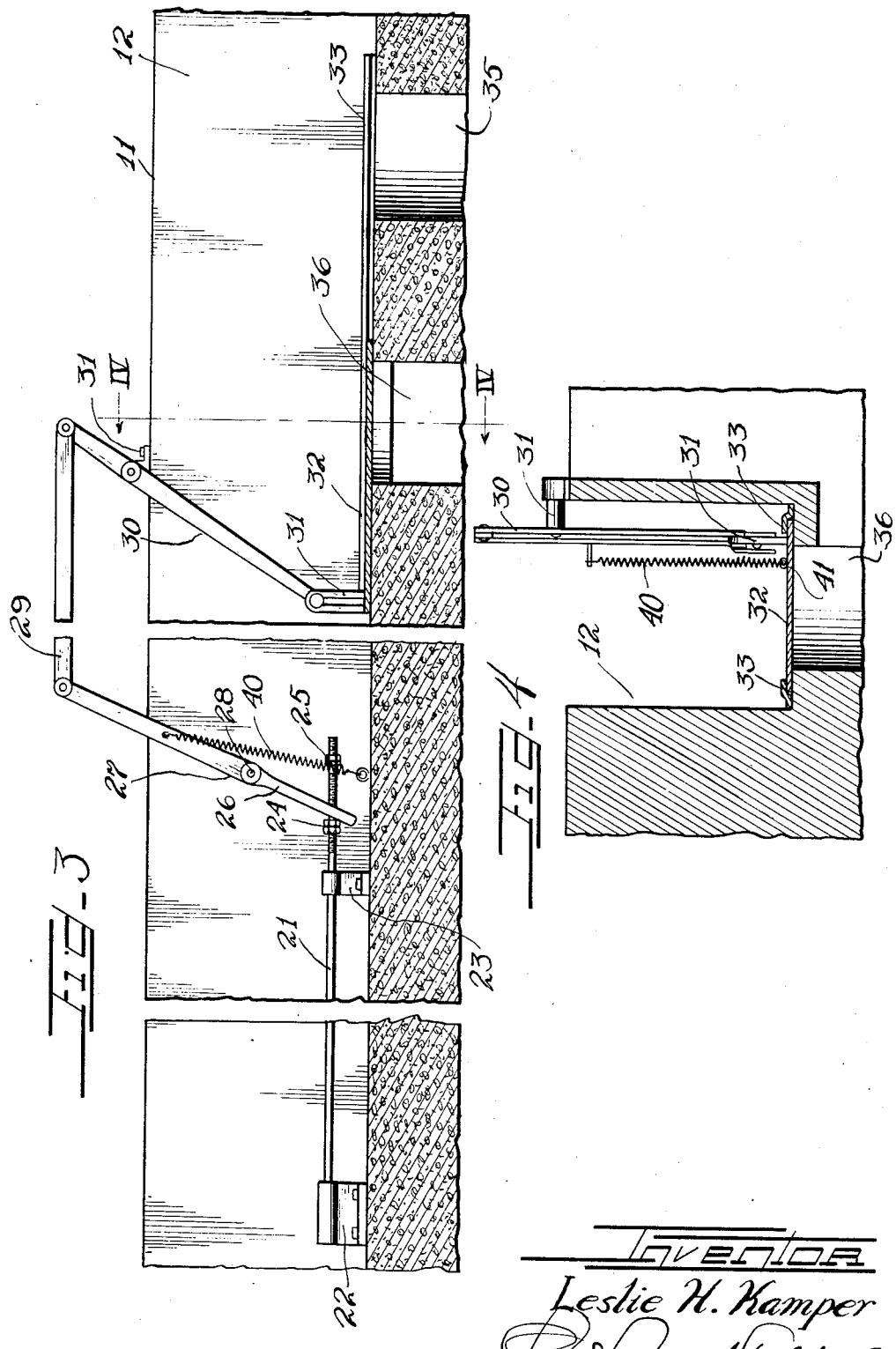

Patented Aug. 8, 1933

1,921,232

UNITED STATES PATENT OFFICE 1,921,232

AUTOMATIC CONTROL SYSTEM FOR WASTE WATER

Leslie H. Kamper, Chicago, Ill., assignor to King's Laundry Co., Chicago, Ill., a Corporation of Illinois Application May 31, 1930. Serial No. 458,819

3 Claims. (Cl. 257—2)

The present invention relates to an automatic control system for waste water of the same general character as that disclosed in my copending patent application Serial No. 458,818 filed May 31, 1930, and more particularly to a method of and apparatus for controlling the delivery of waste water from a washing machine to a heat reclaiming apparatus as a function of the temperature of the water flowing between the machine and the apparatus whereby only water of above a predetermined temperature will be allowed to enter the reclaiming apparatus.

In the last few years the laundry industry has, in order to reduce their overhead, adopted numerous economy devices, such for example, as the water pre-heater with a view of reducing to a minimum the overhead and size of the power plant required to carry on a given laundry business.

In use the conventional water pre-heater is adapted to receive all of the waste water leaving the washing machines of a laundry irrespective of whether this waste water comprises a hot washing liquid or a cold rinsing water. It will be evident that this practice results in the average temperature of the water delivered to the pre-heater being materially reduced and as a result the pre-heater is not as efficient as it should be were it to receive only the hot washing liquid.

I propose in accordance with the features of this invention to provide a method of and apparatus for controlling the water delivered to the pre-heating apparatus as a function of the temperature of the water flowing between the washing machine and the apparatus so that only water above a predetermined temperature is allowed to reach this apparatus.

I also aim to make the above discussed method and apparatus for controlling the water and deliver it to the preheating apparatus of an automatic nature so that it is in no way dependent upon the human element.

It will, therefore, be evident that an object of the invention is to provide a method of and apparatus for controlling the diverging of the waste water of a washing machine to either a pre-heater or directly to the waste water disposal system automatically and as a function of the temperature of the water flowing between the washing machine and the pre-heater.

A further object of the invention is to provide thermally controlled valve means positioned in the path of the water leaving the washing machine for diverting the water from this path into the sewer whenever the temperature of the water falls below a predetermined point.

In accordance with the general features of this invention there is provided thermally operable valve means adapted to be positioned in a waste water gutter under a washing machine and operable to automatically divert the water from the gutter into a conduit leading directly to the sewer whenever the temperature of the water in the gutter falls below a predetermined point whereby only water having a temperature above said predetermined point will be conveyed by said gutter to a pre-heating system.

Other and further objects and advantages of this invention will more fully appear from the following detail description taken in connection with the accompanying drawings which illustrate a single embodiment thereof, and in which Figure 1 is a fragmentary plan view of a washing machine and a pre-heater connected by a common gutter in which is disposed thermally sensitive valve means for at predetermined times diverting the water from the gutter to the sewer.

Figure 2 is a fragmentary enlarged plan view of the thermally operable valve means of my invention.

Figure 3 is an enlarged fragmentary sectional view taken on the line III—III of Figure 2 looking in the direction indicated by the arrows; and Figure 4 is a fragmentary transverse sectional view taken on the line IV—IV of Figure 3 looking in the direction indicated by the arrows.

As shown on the drawings:

The reference character 10 designates generally a conventional laundry washing machine supported upon a concrete floor 11 having formed therein a gutter 12 extending under and longitudinally of the machine for receiving waste water therefrom. This gutter need not be individual to a single washing machine but may be common to a plurality of such machines disposed in a line over the gutter.

The gutter 12 is adapted to be put into communication with either of two water-passageways or conduits 13 and 14, the former of which leads to a conventional pre-heater 15 and the latter of which leads to a gutter 16 connected directly to the water disposal system or sewer.

The pre-heater 15 which is of a conventional construction includes the usual coils 16 through which fresh water for use in the laundry is passed so as to have imparted to it heat from the waste water delivered to the pre-heater 15 by the conduit 13. After the waste water has passed through the pre-heater 15 it is discharged into the sewer gutter 16.

Mechanism is provided for automatically establishing a communication between the gutter 12 and either one of the two conduits 13 and 14 and this mechanism comprises a thermally operated valve structure designated generally by the reference character 20. This mechanism 20 is disposed in the gutter 12 and includes a thermally sensitive bi-metallic rod 21 positioned directly over the bottom of the gutter. One end of this rod 21 is fastened to the bottom of the gutter by means of a bracket 22. The other end of this rod is loosely carried by a supporting bracket 23 also fastened to the bottom of the gutter, (Figure 3). The free end of the rod 21 is threaded and has secured thereon spaced nuts 24 and 25.

Straddling the threaded portion of the rod 21 between the nuts 24 and 25 is a bifurcated end 26 of a lever 27 which is pivotally carried at 28 by a pin secured to the side-walls of the gutter 12. The upper arm of the lever 27 is pivotally connected to one end of a link 29 the other end of which is pivotally connected to the upper arm of a lever 30 pivotally carried by bracket means 31 secured to the cement floor 11. The lower arm of the lever 30 is pivotally connected to a vertical lug 31 secured to a gate-valve-plate 32 slidably disposed in spaced guides 33—33 secured to the bottom of the gutter 12.

This valve-plate 32 is adapted to be moved into either one of two positions, in one of which it will cover a passageway 35 in the bottom of the gutter disposed in communication with the conduit 14 and in the other of which it is adapted to cover the passageway 36 in the bottom of the gutter disposed in communication with the conduit 13.

In order to insure that the valve plate 32 will be forced into either of its two positions there is provided a spring 40 having its upper end fastened to an intermediate portion of the top arm of the lever 27 and having its lower end secured to an eye 41 fastened to the bottom of the gutter 12. This spring is adapted to act past the center of the pivot of lever 27 for the purpose of forcing this lever into either one of two positions, the movement of the lever is either direction being limited by the nuts 24—25.

The operation of this thermally sensitive valve mechanism of my invention is briefly as follows:

As long as the water flowing in the gutter 12 from the washing machine 10 is above a predetermined temperature, which for example may be 120° F. the thermally sensitive rod 21 will force the valve plate 32 in a position in which it covers the passageway or opening 35 whereby the water flowing in the gutter 12 is diverted to the pre-heater 15.

However, if the temperature of the water flowing in the gutter 12 should fall below the predetermined point then the thermally sensitive rod 21 will contract and actuate the levers 26 and 30 so as to move the valve plate 32 to the full line position shown in the drawings at which time the opening 36 will be covered and the water will be diverted through the opening 35 directly to the gutter 16 leading to the sewer and thus being bi-passed around the pre-heater 15.

This arrangement is obviously advantageous in that it will mean that when the washing machine 10 is discharging cold water such as cold rinsing water into the gutter 12 this cold water will not be discharged into the pit housing the pre-heater 15 and thus will not effect the average temperature of the waste water delivered to the pre-heater. By not adding the cold rinsing water to the hot waste water in the pit of the pre-heater 15 it necessarily follows that a greater amount of British thermal units will be imparted to the fresh water flowing through the coil 16 of the pre-heater and the efficiency of the pre-heater will be greatly enhanced.

Now I desire it understood that although I have illustrated and described in detail the preferred embodiment of this invention the invention is not to be thus limited but only insofar as defined by the scope and spirit of the appended claims.

I claim as my invention:

1. In an apparatus for controlling the discharge of liquid from a machine such as a washer and the like, a gutter below the machine into which liquid is discharged from said machine, thermally sensitive means responsive to the temperature of liquid flowing in said gutter, a plurality of conduits for receiving the liquid from said gutter and means operable by said thermally sensitive means for causing said liquid to be delivered to one or the other of said conduits in accordance with the temperature of the liquid.

2. In an apparatus for controlling the discharge of liquid from a machine such as a washer and the like, a gutter below the machine into which liquid is discharged from said machine, thermally sensitive means responsive to the temperature of liquid flowing in said gutter, a plurality of conduits for receiving the liquid from said gutter and means operable by said thermally sensitive means for causing said liquid to be delivered to one or the other of said conduits in accordance with the temperature of the liquid, said thermally sensitive means including a heat sensitive element in said gutter and a valve operable thereby for controlling the diversion of liquid from one conduit to the other conduit.

3. An apparatus for controlling the discharge of liquid from a machine such as a washer and the like, a gutter below the machine into which liquid is discharged from said machine, a plurality of branch conduits having port openings in communication with said gutter, one of said conduits being arranged to conduct the liquid to a heat exchange device and the other to conduct the liquid to a position of waste, a valve member operatively positioned relative to said port openings to collectively control the passage of liquid from said gutter into said conduits, a thermal responsive element in said gutter disposed in the path of the liquid, and linkage means connecting said element to said member, whereby said ports are selectively opened and closed depending upon the temperature of liquid in said gutter.

LESLIE H. KAMPER.